July 3, 1923.
R. H. S. ABBOTT ET AL
1,460,933
APPARATUS FOR MOLDING PLASTIC SUBSTANCES
Filed Jan. 16, 1922    2 Sheets-Sheet 2
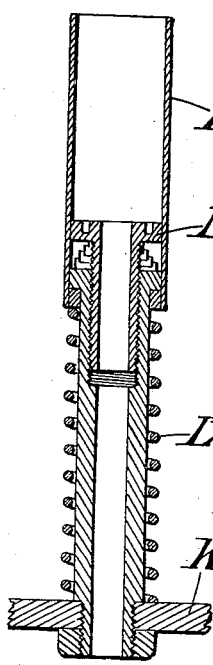
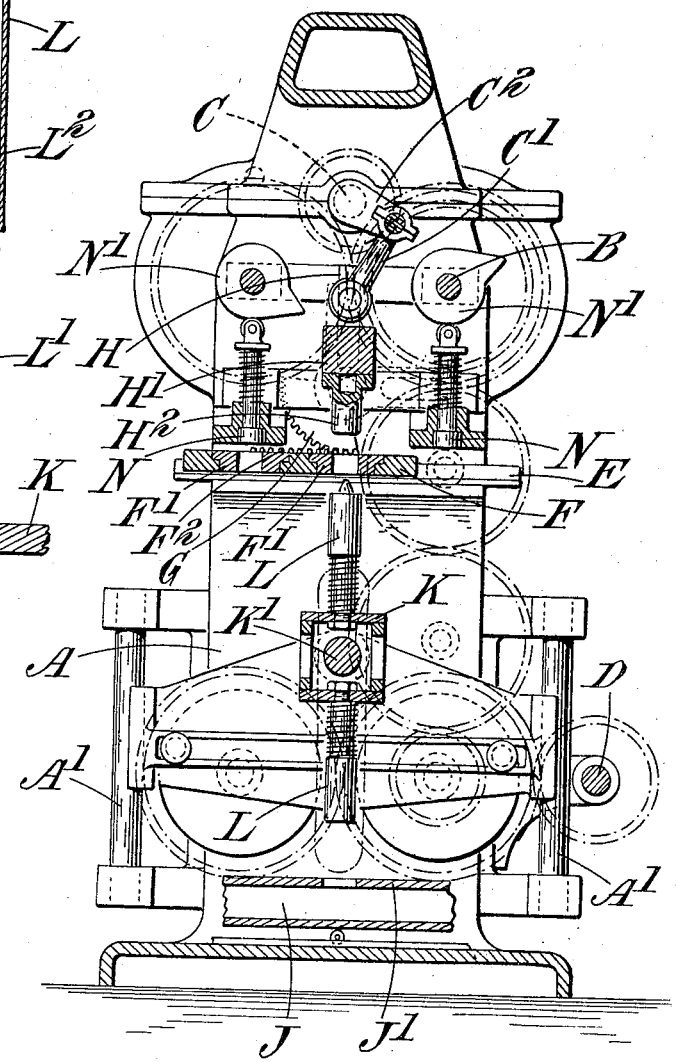

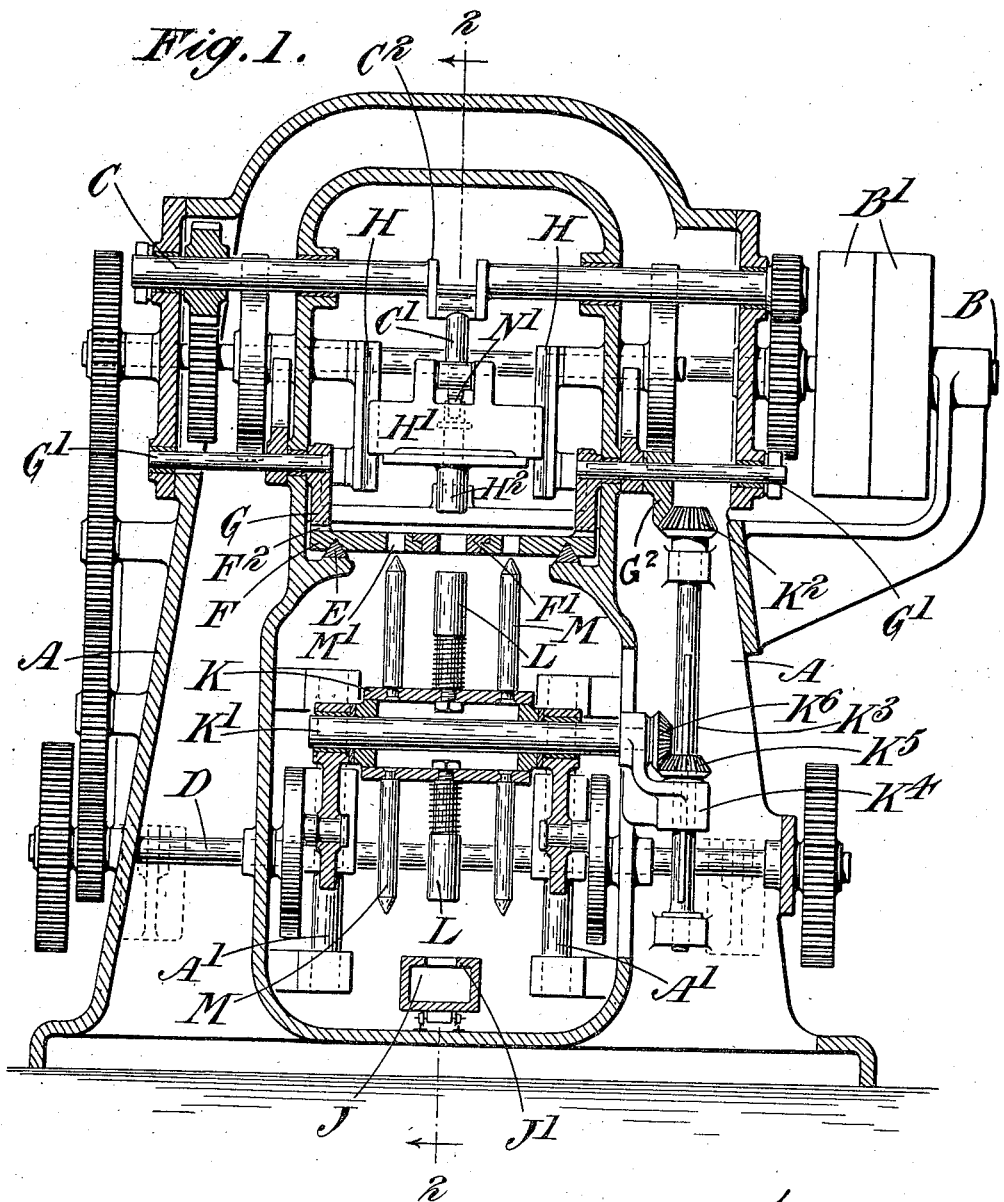

Patented July 3, 1923.

1,460,933

UNITED STATES PATENT OFFICE.

RICHARD HARTLEY SMITH ABBOTT AND JAMES BROOKS CLOSE, OF LONDON, ENGLAND.

APPARATUS FOR MOLDING PLASTIC SUBSTANCES.

Application filed January 16, 1922. Serial No. 529,736.

*To all whom it may concern:*

Be it known that we, RICHARD HARTLEY SMITH ABBOTT and JAMES BROOKS CLOSE, subjects of the King of England, and both residing at London, in England, have invented certain new and useful Improvements in Apparatus for Molding Plastic Substances, of which the following is a specification.

The invention relates to apparatus for molding plastic substances and has for its object to provide an apparatus which can either be employed to complete simple molding operations or be utilized to feed plastic material to a machine in which this material is subjected to further shaping operations.

According to this invention the apparatus comprises a plate, table or conveyer provided with recesses or perforations into which the plastic material is fed from a supply receptacle in the form of a cake or pellet. The feed mechanism comprises one or more charging chambers so constructed as first to dip into the supply receptacle and pick up a charge of plastic material therefrom, next to move into register with a perforation or recess in the plate and then to discharge or expel their contents in the form of a cake or pellet into the recess against the base of the latter or, when a perforated plate is used, into the depth of the perforation, against some restricted portion of the perforation or against some temporary stop or anvil co-operating with the plate.

One form of apparatus in accordance with this invention adapted to deliver plastic material in the form of a cake or pellet into perforations formed in a reciprocating plate or table is illustrated by way of example in the accompanying drawings, in which—

Figure 1 is a sectional side elevation.

Figure 2 is a section on the line 2—2 of Figure 1, and

Figure 3 is a detail view on an enlarged scale showing one of the charging chambers in longitudinal section.

The apparatus comprises a pair of yoked standards A provided with a driving shaft B upon which fixed and loose pulleys B' are keyed in the ordinary manner. The shaft B drives a countershaft C above it and through suitable train gear wheels a second countershaft D near the bed of the machine.

Mounted between the countershafts on supporting guides E is a plate or table F slotted to receive interchangeable perforated plates F'. The table F is intermittently reciprocated in any known manner, in the particular example illustrated this movement being obtained by means of toothed quadrants G mounted on shafts G' engaging racks F² on the face of the table and Geneva stop or other known mechanism being employed to rock the quadrants in the desired manner.

Mounted above the table is a pair of fixed vertical guides H carrying a cross head H' which is reciprocated upon the guides by means of a connecting rod C' coupled to a crank C² formed on the shaft C. This cross head carries an interchangeable plunger or plungers H² adapted to co-operate with the openings in the perforated plate F'.

Disposed below the table is an annular trough or receptacle J for the plastic material, this trough being constantly supplied with plastic material in powdered or plastic form from a suitable supply hopper which is preferably agitated to ensure a constant supply. If desired the trough may be mounted upon a circular track along which it is caused to travel in any suitable manner.

Mounted upon guides A' below the table is a reciprocating support K carrying a series of charging chambers L, the support K which is caused to reciprocate in any suitable means but in the example illustrated from a mechanism of the Geneva stop type, not only reciprocating but also turning about its supporting pivot K' towards the end of its reciprocating movement. This turning movement is obtained in the example illustrated by means of a toothed bevel quadrant G² on the shaft G' of one of the toothed quadrants G engaging a bevel pinion K² on a vertical shaft K³. The shaft K³ is provided with a spline and carries a bracket K⁴ which is free to slide in an axial direction along the shaft K³ when the support K is reciprocated. The bracket K⁴ which is supported on the end of the shaft K' also forms a bearing for a bevel pinion K⁵ which meshes with a pinion K⁶ on the shaft K' so that when the toothed quadrant G is rocked, the shaft K³ and the pinion K⁵ are also rocked thus causing the support K to rotate while the support is still undergoing its reciprocating movement.

Each charging chamber comprises a cylinder L controlled by a spring L' the cylinder being adapted to move in an axial direction against its spring relatively to a stationary inner plunger L², the plungers L² being preferably adjustable within the cylinders as shown in Figure 3 so as to vary the contents of each charging chamber or cylinder in accordance with requirements.

Any number of charging chambers can be mounted upon the support K and preferably, as shown these are arranged on two faces of the support so that when one charging chamber is inoperative the opposite charging chamber or sets of chambers will be in operation. The support preferably carries positioning or centering rods such as M which register with apertures M' in the reciprocating table and so secure proper registration between the charging chamber or chambers and the openings in the perforated plate.

The arrangement is such that when the support K carrying the cylinders L is reciprocated, the open ends of these cylinders dip into the supply trough J and make contact with the base of the trough. Should the nature of the plastic material render it necessary then the cylinders may yield slightly relatively to their plungers so that a charge of powdered or plastic substance is pressed into each charging cylinder. Alternatively when plastic clay or like substance is being treated, the open ends of the charging cylinders need not yield or touch the base of the trough, suitable means being then provided to prevent such relative movement during the stage of the filling operation.

After dipping into the trough in this manner the support K rises from the trough and as it rises turns upon its pivot K' so as to bring the open ends of the charging cylinders L into register with the perforations in the plate F'. Simultaneously the positioning members M engage the apertures M' in the table and so hold the table against reciprocatory movement. Continued upward movement of the support K causes the cylinders L to yield relatively to the plungers L² whereupon the plungers expel or deliver into the perforations a charge of plastic material taken up from the trough. Simultaneously the plungers H² are brought into contact with the face of the plate F' so as to form a temporary top or cover to the perforations in the plates. The face of the cake or pellet is thus pressed between the upper plunger H² and the lower one, which then forms an anvil. Alternatively the shape or depth of the perforations may be such as to render such an upper plunger unnecessary or in place of a perforated plate a recessed plate or one carrying inverted trays or tins may be employed. As soon as the charging operation is complete the support K recedes and is turned over at the same time the table being reciprocated so as to bring the perforated plate and the pellet or pellets fed into the perforations therein under one or other of a pair of discharging plungers N, these plungers being intermittently reciprocated so as to expel the pellets in the downward direction on to a suitable conveyer by means of cams N' driven from the main shaft in any suitable manner.

The feed mechanism above described is substantially similar whether the molding machine comprises additional shaping dies or in cases where it is desired merely to mould plastic material into the form of a cake or pellet.

For example, if it is desired merely to charge circular tins or cups with plastic material, the tins may be removably mounted in the perforations in the table and held therein by any suitable means during the charging operation, these tins being subsequently removed from the perforations in the table in any suitable manner, after the charging cylinders have receded and the perforated table has advanced clear of the charging chambers.

Alternatively, where the cake or pellet of plastic material is to be further shaped after being delivered into the perforations in the plate or table, as the latter is moved, the perforations are brought between a pair of shaping dies, one or both of which may be reciprocated to impart the desired shape to the pellet carried by the perforated table. The mechanism employed to operate the dies does not form any part of the present invention and may vary in accordance with the nature of the article to be formed, while further the shape of the perforations in the plate and of the charging chambers, previously referred to for the sake of simplicity as charging cylinders, will also naturally vary in accordance with the configuration of the article to be moulded.

When the desired shape has been imparted to the cake or pellet carried by the perforations in the table, further movement of the table brings the moulded article, still supported in the perforations, below a suitable ejecting mechanism which is preferably similar to that already described.

In all cases to prevent plastic material adhering to the outer walls of the charging chambers after the latter have dipped into the supply trough or receptacle, a guide plate or baffle J' provided with perforations corresponding in outline to those of the charging chambers is mounted above the open mouth of the trough so that as the charging chambers leave the trough, any plastic material adhering to the outer walls is scraped off by this plate.

When it is desired simultaneously to deliver pellets of varying thickness from the supply trough, the trough is provided with a false bottom and the capacity of the charging chambers is correspondingly varied so that whereas in one half of the trough the full depth of plastic material obtains, the other half contains a lesser depth dependent upon the level of the false bottom.

Although in the above description an annular rotary supply trough or receptacle has been described, if desired a stationary trough may be employed provided with any suitable means for maintaining therein the requisite level of plastic material. Further it is to be understood that the constructional details of the apparatus may be varied very considerably without departing from this invention and that in place of a reciprocating table any perforated or recessed plate or conveyer adapted to be rotated or moved intermittently in a plane at right angles to the path of the reciprocating charging plungers, may be employed without departing from this invention.

What we claim as our invention and desire to secure by Letters Patent is:—

1. In apparatus for molding plastic substances, the combination of a plate having recesses or perforations therein, a receptacle for the plastic substance and a reciprocating member adapted alternately to dip into the receptacle and to deliver plastic substance therefrom into the perforations or recesses in the plate in the form of a cake or pellet.

2. In apparatus for molding plastic substances the combination of a plate having recesses or perforations therein, a receptacle for the substance to be moulded disposed below said plate and feed mechanism comprising a pivotally mounted charging chamber, means for reciprocating such chamber towards and away from the receptacle and for rotating the chamber about its pivots so that the chamber first dips into the receptacle and then delivers a measured charge of plastic substance therefrom into a recess or perforation in the form of a cake as set forth.

3. In apparatus for molding plastic substances the combination of a plate having recesses or perforations therein, a receptacle for the substance to be moulded disposed below said plate, feed mechanism comprising a pivotally mounted support, a plurality of charging chambers thereon, means for reciprocating said support and chambers towards and away from the receptacle, means for causing the support to turn about its pivots so as to dip into the receptacle and deliver a charge therefrom in the form of a cake into the recesses or perforations in the plate, and means for varying the capacity of the charging chambers as set forth.

4. In apparatus for molding plastic substances the combination of a plate having perforations therein, a reciprocating shaping die disposed above and co-operating with said plate, a receptacle for plastic substance disposed below the plate and means for delivering plastic substance from the receptacle into the perforations in the plate in the form of a cake as set forth.

5. In apparatus for molding plastic substances the combination of a plate having perforations therein, a reciprocating shaping die disposed above and co-operating with the plate, a receptacle for plastic substance disposed below the plate and feed mechanism adapted to dip into the receptacle and deliver measured quantities of plastic substance therefrom into the perforations in the form of a cake, said mechanism also constituting an anvil against which the cake is further pressed by means of the upper reciprocating die as set forth.

6. In apparatus for molding plastic substances the combination of a perforated plate, a pair of dies disposed above and below said plate, means for reciprocating said dies towards one another, means for moving the plate intermittently in a path at right angles to that of the dies, a receptacle for plastic substance disposed below the plate and mechanism for feeding the plastic substance from the receptacle in the form of a cake into the perforations prior to the plate being moved between the reciprocating dies as set forth.

7. In apparatus for molding plastic substances the combination of a plate having recesses or perforations therein, a receptacle for plastic substance disposed below said plate, means for varying the depth of the plastic substance contained within said receptacle, and adjustable mechanism for transferring plastic material from the receptacle to the perforations in the plate in the form of a cake as set forth.

In testimony whereof we have signed our names to this specification.

RICHARD HARTLEY SMITH ABBOTT.
JAMES BROOKS CLOSE.